(12) United States Patent
Kuhlmann et al.

(10) Patent No.: US 6,656,382 B1
(45) Date of Patent: Dec. 2, 2003

(54) USE OF LAYERED DOUBLE HYDROXIDES (LDHS), WHICH REVERSIBLY BIND (EXCHANGE) NITRATE

(75) Inventors: Hermann Kuhlmann, Dulmen (DE); Paul Seward, Munster (DE); Josef Christian Buhl, Wathlingen (DE); Kirstin Beavers, Hannover (DE); Manfred Schenk, Hannover (DE); Claus Bull, Hannover (DE)

(73) Assignee: Hydro Agri Deutschland GmbH, Dulmen (DE)

( * ) Notice: Subject to any disclaimer, the term of this patent is extended or adjusted under 35 U.S.C. 154(b) by 0 days.

(21) Appl. No.: 09/509,743

(22) PCT Filed: Oct. 2, 1998

(86) PCT No.: PCT/DE98/02927

§ 371 (c)(1),
(2), (4) Date: Jun. 2, 2000

(87) PCT Pub. No.: WO99/17879

PCT Pub. Date: Apr. 15, 1999

(30) Foreign Application Priority Data

Oct. 2, 1997 (DE) .......................................... 197 43 606

(51) Int. Cl.[7] .................... C01B 31/16; A01N 25/00; C02F 1/42

(52) U.S. Cl. ............... 252/184; 71/58; 71/59; 71/61; 71/63; 71/64.03; 71/64.01; 71/64.07; 71/903; 210/683; 210/684; 210/688

(58) Field of Search .............. 252/184; 210/683, 210/684, 687, 688, 903; 71/58, 59, 61, 63, 64.03, 64.01, 64.07, 903

(56) References Cited

U.S. PATENT DOCUMENTS

| | | | | |
|---|---|---|---|---|
| 3,980,462 A | * | 9/1976 | Corte et al. ................ | 71/1 |
| 4,333,846 A | * | 6/1982 | Lee et al. .................... | 252/184 |
| 4,392,961 A | * | 7/1983 | Lee et al. .................... | 210/679 |
| 4,392,979 A | * | 7/1983 | Lee et al. .................... | 252/184 |
| 4,392,980 A | * | 7/1983 | Lee et al. .................... | 252/184 |

(List continued on next page.)

FOREIGN PATENT DOCUMENTS

| | | | |
|---|---|---|---|
| DE | 38 02 376 A1 | | 1/1988 |
| DE | 41 25 627 A1 | | 8/1991 |
| DE | 33 21 053 C2 | | 12/1992 |
| EP | 0 207 707 | | 1/1987 |
| GB | 1 336 864 | | 11/1973 |
| GB | 1 336 866 | | 11/1973 |
| JP | 05317603 A | * | 12/1993 |
| WO | WO 55057 A1 | * | 8/2001 |

OTHER PUBLICATIONS

H. Hansen et al.; The Use of Glycerol Intercalates in the Exchange of $CO_3^{2-}$ With $SO_4^{2-}$, $NO_3^-$ or $Cl^-$ in Pyroaurite–Type Compounds; , 1991 The Mineralogical Society; Clay Minerals (1991) 26, pp. 311–327.

S. I. Wada and K. Masuda, "Control of Salt Concentration of Soil Solution by the Addition of Synthetic Hydrotelctite", *Soil Science Plant Nutrition*, 41 (2), 377–381, 1995.

*Primary Examiner*—Margaret Medley
(74) *Attorney, Agent, or Firm*—Whitham, Curtis & Christofferson, P.C.

(57) ABSTRACT

Minerals that reversibly fix ions, in particular $NO_3^-$, i.e. that can exchange one anion for another anion can be used as fertilizers and soil conditioners, as well as for the purification and treatment of water, particularly for the elimination of nitrate. The minerals used are preferably natural or synthetic mixed value metal-metal-hydroxyl salts, e.g. layered double hydroxides (LDHs) that contain exchangeable fixed anions in the intermediary layers. A method for producing anion-exchanging minerals, particularly suitable LDHs, and their use as fertilizers and soil conditioners and for the purification and treatment of water.

17 Claims, 4 Drawing Sheets

Figure 1:
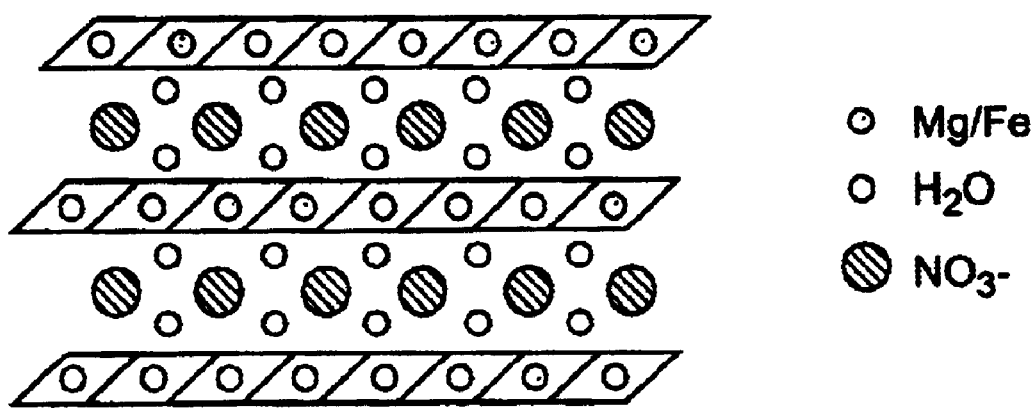

□ Nitrate content
▨ Nitrate release in 1 M KCl
▨ Nitrate release in 0.5 M K$_2$SO$_4$
▨ Nitrate release in 5 mM KCl
▨ Nitrate uptake from 10 mM KNO$_3$ after extraction in 1 M KCl

U.S. PATENT DOCUMENTS

| | | | |
|---|---|---|---|
| 4,396,412 A | | 8/1983 | Heller et al. .................... 71/27 |
| 4,769,079 A | * | 9/1988 | Clark et al. .................. 252/184 |
| 4,769,080 A | * | 9/1988 | Clark et al. .................. 252/184 |
| 4,773,936 A | * | 9/1988 | Clark et al. .................. 252/184 |
| 4,840,676 A | * | 6/1989 | Clark et al. .................. 252/184 |
| 5,232,887 A | * | 8/1993 | Arena et al. ................. 502/163 |
| 5,302,709 A | * | 4/1994 | Pinnavaia et al. ........... 540/131 |
| 5,414,080 A | * | 5/1995 | Pinnavaia et al. ........... 540/145 |
| 5,459,259 A | * | 10/1995 | Pinnavaia et al. ........... 540/139 |
| 5,728,363 A | * | 3/1998 | Martin et al. ........... 423/594.16 |
| 5,976,401 A | * | 11/1999 | Suzuki et al. ................ 252/184 |

* cited by examiner

USE OF LAYERED DOUBLE HYDROXIDES (LDHS), WHICH REVERSIBLY BIND (EXCHANGE) NITRATE

The invention concerns a process for preparing an anion-exchanging mineral and the use of such minerals which reversibly bind (exchange) anions such as $NO_3^-$, among others, as improvements for fertilizers and soil, or for purifying and treatment of water, especially to remove nitrate.

In a broader sense, the invention concerns the intentional addition and removal of nitrates.

IS Optimal nutrition of crop plants, both in the open air and in the greenhouse, requires, among other things, an adequate nitrogen supply timed to match the plant growth. As a general guideline, one can assume that about 200 kg N/hectare is needed during one vegetation phase, with plants having different needs, depending on the species and variety and on their stage of development.

Supplying nitrogen to plants in the proper amount at the right time is not simple, for various reasons. Nitrogen can be made available in the form of ammonium ions ($NH_4^+$) or nitrate ions ($NO_3^-$). In the soil, there is a complex equilibrium between the various forms of bound nitrogen. There are microorganisms in the soil—in various proportions—which can convert ammonia into nitrate.

Because the soils on which we grow crops do not have much anion-exchange ability, though, the nitrate is easily washed out into surface water and ground water. Nitrification inhibitors are often used at times to inhibit the soil microorganisms so as to avoid excessive conversion of ammonium into nitrate.

Washing out of cations, by comparison, is of secondary importance, because they can be bound to the exchange sites of the clay minerals normally present in the soil. Therefore ammonium ions and the other cations important for plant culture, such as potassium, magnesium, and calcium, can be held well enough in our crop soils. The extremely sandy soils with very low clay content are exceptions, where cation washout is also a problem.

Various ways are known at the state of the art by which useful nitrogen can be made available to plants for long periods. Known fertilizers and soil improvers with depot action, for instance, work with fertilizer mixtures from which nitrogen is supposed to be released at different times in a vegetation period.

For example, a fertilizer with long-term action and programmed nutrient release for providing the nutrient requirements of a plant during a culture period, in the form of a mixture of an initial release, a long-term release, and a final release, is known from DE 33 21 053 C2. The long-term releaser and the final releaser comprise particles of fertilizer of certain particle sizes with coatings which prevent immediate release of nitrogen.

Furthermore, soil substrates are also known which can be used directly for growing crops—in greenhouses, for instance—or as soil improvers. They are reported to consist for the most part of neutral porous materials such as zeolites and the like, and their physical adsorption and filtering actions are utilized.

The known fertilizing and soil-improving agents also have the disadvantage that they do not release nutrients as they are required by the plants. Rather, the release is a result of the action of soil factors (temperature, water, microorganisms). It follows that nutrients which are released because of soil factors, with simultaneous low requirement of the plants for nutrients, are potentially exposed to washout and can cause pollution.

Thus the invention is based on the problem of finding an environmentally acceptable anion exchanger with particularly good exchange capacity for nitrate ions.

With respect to a fertilizer improver and soil improver, the objective is to find such an agent that has a buffering action on the nitrate content in the soil solution. Thus it can provide the nitrogen requirement of the plants through continuous release of nitrate as needed. On the other hand, it can bind again any excess nitrate in the soil and in the ground water flowing through it. Thus the agent can simultaneously supply crop soils with nitrogen in the form of nitrate.

With respect to an agent for purifying and treating water, the objective is to remove nitrate efficiently and economically from drinking water or waste water.

These objectives are attained through the process according to the invention for preparing an anion exchanging mineral and the use of anion-exchanging minerals which exchange $NO_3^-$, among others, reversibly, as fertilizer and soil improvers and for purifying and treating water.

Experiments by the inventor have shown that certain mineral double salts can be used well as anion exchangers in the sense of this invention. A special precipitation process is recommended here to prepare such anion-exchanging minerals as are suitable to attain the objective.

The process according to the invention comprises coprecipitation from a highly carbonate-free aqueous alkaline solution of at least one metal salt from the group:
$Ca^{2+}$, $Mg^{2+}$, $Fe^{2+}$, $Ni^{2+}$, $Zn^{2+}$, $Co^{2+}$, $Cu^{2+}$, $Mn^{2+}$, $Li^-$, nitrate, sulfate, chloride or hydroxide and at least one metal salt from the group $Al^{3+}$, $Fe^{3+}$, $Cr^{3+}$, $Mn^{3+}$, nitrate, sulfate, chloride, or hydroxide, with the precipitation reaction controlled over an extended period;

separation of the precipitated product, and heat-treating the precipitated product, i.e., carrying out a thermal treatment at up to 350° C., preferably up to 250° C.

The carbonate content during the precipitation should be as low as possible, as carbonate is not exchangeably bonded in the material, so that anion exchange is severely reduced by any carbonate content. On precipitation over an extended period, one gets a well-crystallized laminar double hydroxide (LDH) which, as described below, exhibits good exchange characteristics under soil conditions and which, charged with the appropriate anions, is also well suited for water purification.

The precipitation reaction should take place over a long period. After precipitation, a heat treatment up to 300° C., preferably up to 250° C., is carried out to improve the crystallinity and exchange behavior.

In a further development of the invention, the precipitated or separated mineral can, after washing and drying, be treated with acid and/or phosphate solution. The post-treatment with biphosphate salts causes coagulation (flocculation of the individual particles). The post-treatment with acid is done for further deliberate influence on the crystallinity.

Preferably the pH of the solution is held constant in the alkaline range during the precipitation, preferably at pH 12±2. Accurate control of the pH also improves the crystallinity of the product. For that reason the precipitation should be monitored, as with a pH-stat.

Potassium hydroxide (KOH) is used preferably as the base to adjust the alkaline medium.

Particularly good results for the purpose of the invention have been achieved if the first group of metal salts comprises magnesium nitrate and the second group of metal salts comprises $Al^{3+}$ or $Fe^{3-}$ nitrate. Minerals obtained from these salt combinations are particularly suitable as fertilizer and soil improvers. The exact composition of cations and anions can be made dependent on the particular area of application, i.e., on the nature of the soil and the crop species, as they affect the exchange behavior.

One the other hand, minerals synthesized from $Ca^{2+}$, $Mg^{2+}$, sulfate, chloride and hydroxide as salts of the first group and from $Al^{3+}$, $Fe^{3-}$, $Cr^{3+}$, $Mn^{3+}$, sulfate, chloride, and hydroxide as salts of the second class are preferred for water treatment and purification. These materials are also suitable as soil improvers.

The minerals prepared by the process according to the invention, which exchange $NO_3^-$, among others, reversibly—or corresponding natural or synthetic minerals—are usable as fertilizers and soil improvers.

These are preferably natural or synthetic mixed-valence basic metal-metal salts and preferably essentially carbonate-free laminar double hydroxides (LDHs) which have exchangeable anions bound in the intermediate layers and which can be represented by the following formulas:

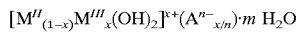

in which
- $M^{II}$ is a bivalent metal ion such as Ca, Mg, Fe, Ni, Zn, Co, Cu, Mn, or 2 Li, preferably Ca, Mg or Fe,
- $M^{III}$ is a trivalent metal ion, preferably Al, Fe, Cr or Mn,
- $A^{n-}$ is a n-valent anion bound in the intermediate layer, such as nitrate, sulfate, chloride or hydroxide.

LDHs comprise bivalent metal ions ($M^{II}$) surrounded by $OH^{31}$ Replacement of the bivalent metal ions in the lattice by trivalent metal ions ($M^{III}$) produces an excess of positive charge, which can be balanced by anions ($A^{n-}$) in the intermediate layer. Hydrotalcite and pyroaurite have structures like those of the LDHs.

The anions of the minerals obtained according to the invention can be exchanged appropriately for the particular purpose. For use as a fertilizer, as much nitrate as possible is put into the mineral and thus into the soil. That can be done directly in the synthesis, or it can be done later by saturation with a flowing nitrate solution (on a column, for instance), with the other ions being displaced by nitrate.

For use as an agent for purifying and denitrifying water, the mineral should initially contain as little nitrate ion as possible; that is, practically none. Then the anions are preferably chloride ions. One could also consider $SO_4^{2-}$.

Corresponding natural LDH-like minerals can also be used according to the invention as fertilizers and soil improvers.

When it is produced as a fertilizer, the mineral, however obtained, is given the highest possible nitrate content. Preferably the fertilizer and soil improver should be almost completely charged with nitrate when they are produced. That is, at least 80% of the exchangeably bound anions in the mineral can be nitrate ions. The complete charging with nitrate ions, with which at least 80% of the anions in the mineral are nitrate ions, corresponds to up to 30% by weight of nitrate anions in the minerals in question, usually between about 10% and 25% by weight. It can also be desirable to add ions other than nitrate to the soil. In this case, the nitrate ion concentration is optionally less than 80 of the anions, depending on what proportion is chosen for the other anions.

In the following culture period, the nitrate is slowly released by ion exchange. As the nitrate anions, like any anions, have a certain affinity with the mineral to be used according to the invention because of the excess of positive charge in the mineral lattice, there is no simple wash-out of the nitrate. Instead, the nitrate content is in an equilibrium between "mineral-bound" and "in solution (in the natural soil water) so that the nitrate concentration is considerably lower than in soils fertilized in the usual manner, but is still enough to meet the requirements of the plants.

The mineral is very stable, and is retained for a long time during the growth phase. Thus the mineral, after an initial phase of nitrate release, be recharged with nitrate derived from fertilization or mineralization. The nitrate can again be released slowly.

Thus the mineral acts as a soil improver by buffering the nitrate content. That is, it takes up nitrate in times of greater $NO_{3-}$ availability and releases it when there is a nitrate deficiency. In this way, the nitrate concentration in the ground solution is maintained at a low level when the plants need little or no nitrate (that is important especially in fallow times, as in the Fall and Winter). Then the mineral makes the bound nitrate available again for the next crop. Therefore the minerals according to the invention are nitrate ion exchangers, and nitrate buffers under soil conditions.

The mineral obtained is this or other ways can also be given the lowest possible nitrate content when it is produced as a soil improver and nitrate buffer.

Thus, the mineral used according to the invention or in the fertilizer or soil-improvement agent reduces the nitrate wash-out from crop soils into the ground water, making a substantial contribution to environmental protection.

The invention assures a nitrate concentration in the soil solution which will be enough to provide for the absorption rate of the roots in optimal development of the plants, and is substantially lower than when the usual nitrate fertilizers are used. The exchangeably bound nitrate is released slowly and as needed, as described above. The release is controlled by the nitrate requirement of the plants. Thus the invention involves a fertilizer with depot action (a "triggered-release fertilizer").

The mineral is stable in the soil for a long time. In contrast to anion exchangers found in the soil in some situations, the exchange capacity is quite independent of the pH. That makes the action reliable under crop conditions. The extremely low anion exchange capacity which soil is known to have is based essentially on amorphous and crystalline iron compounds. Their exchange capacity increases as the pH decreases. Thus the iron compounds are significant only in soils with decidedly acid pH, and otherwise ineffective.

The invention makes it possible to apply the amount of nitrogen needed by a crop in a single application when the crop is started, without the plants being damaged by excessive salt concentration in the soil. The nitrate is held in the upper layer of the soil where roots are thickly developed, so that it is completely available for the plants, particularly for plants which do not have deep roots. Therefore the invention can also be applied advantageously in production of sod, so as to provide the thin layer of soil with anion exchange capability. At the final location, the fertilizing nitrogen is protected from being washed out, as could otherwise easily happen with the very shallow-rooted grass. The invention is also particularly suited for improving the soil of intensively used lawn areas, such as golf courses, sports fields, etc., by giving it anion exchange capacity and thus preventing washout of nitrate.

The invention can be applied in substrates and potting soil as a slow-releasing nitrogen fertilizer. For instance, the invention can be used in commercial gardening for open-air crops, such as Calluna or Erica; for container plants or the like; and in the hobby area for flower beds and balcony plants. The invention is also suitable for lawn fertilization as a slow nitrogen releaser. With this invention, the nitrogen requirement is met continuously over a long period without plant damage by overfertilization.

The invention is also well suited for meeting the nitrogen requirement of crops in hydroponic systems over long periods, and to contribute to stabilization of the salt concentration.

The mineral to be used according to the invention, as a fertilizer and soil improver can also be used with other nutrients in multi-ingredient fertilizers, as in combination with an ordinary mixed fertilizer or with various other fertilizer components and/or other additives.

The fertilizer and soil improver can be applied in strips or rows, or at points, to improve the nitrogen efficiency. Loss of gaseous nitrogen ($N_2$, $N_2O$, NO) and nitrate wash-out are minimized.

The fertilizer can also appear in a preparation with seeds, seedlings, or other propagation material. It is particularly suited for coating seeds with a nitrogen-containing shell to assure the initial nutrition of the seedlings.

The fertilizer and soil improver can be prepared and applied, alone or in combination with other fertilizers, in liquid form, such as an emulsion, gel or paste, or in solid form, as a power, granulate or prills.

The material used as a soil improver according to the invention is also suited for improving areas with high potential for nitrate washout, even if it is not charged with nitrate. This is particularly true for areas with a long history of intensive cultivation, such as with vegetables or special crops, or soils with low water-storage capacity. In general, the invention can be used in all soils where nitrate washout must be expected or is to be prevented.

The special properties pointed out here for nitrate also apply in part for sulfate and similar anions.

The application according to the invention for water purification and treatment, especially for removal of nitrate, is a reversal of the processes that have been presented. With a choice of suitable counterions, such as chloride, it is possible to trap nitrate, by exchange for those counterions, from waters which, for example, have flowed through a mineral layer according to the invention. That can be done, for instance, on an ordinary column, or on a larger scale in a tower. The equilibrium must be maintained so that re-release of nitrate is avoided. Therefore the mineral must be regenerated at certain intervals, as is the case with other industrial ion-exchange processes.

The invention is suitable for purification of wastewater and for purification and treatment of drinking water.

At the same time, the mineral exerts a filtering action, so that large particles and suspended materials can be retained.

The mineral to be used for water treatment can be produced relatively economically. It makes a particularly environmentally favorable treatment process possible, as no synthetic ion-exchangers which would present eventual disposal problems need be used.

With this invention, rather, both applications can favorably be combined, as the ion exchange mineral used for water purification is, when in the charged state (charged with nitrate) is itself a soil improver according to the invention and thus is easily disposed of. It can be added to the compost from city composting plants or even used for fertilization in some other place.

Figure 2:
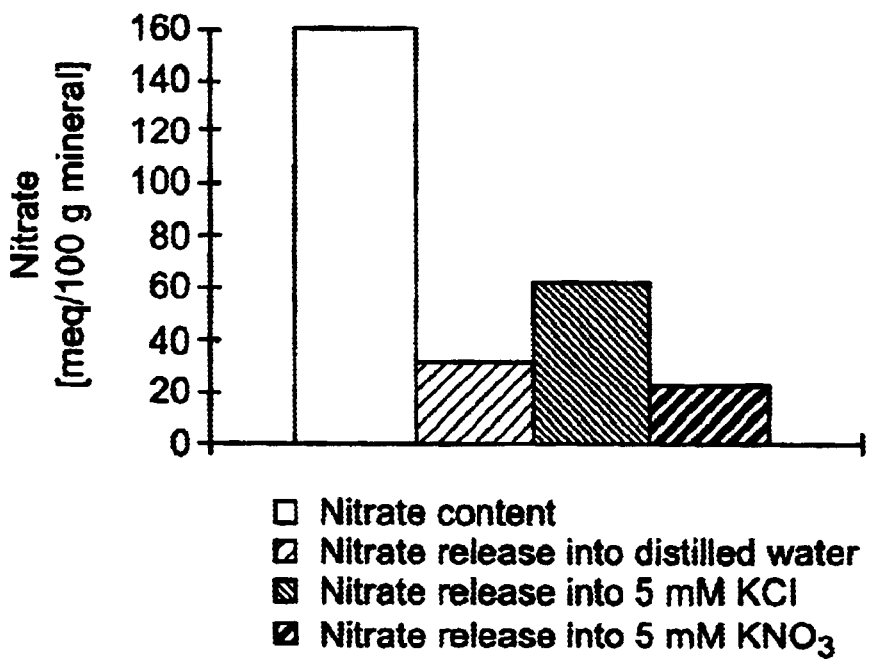
Figure 3:
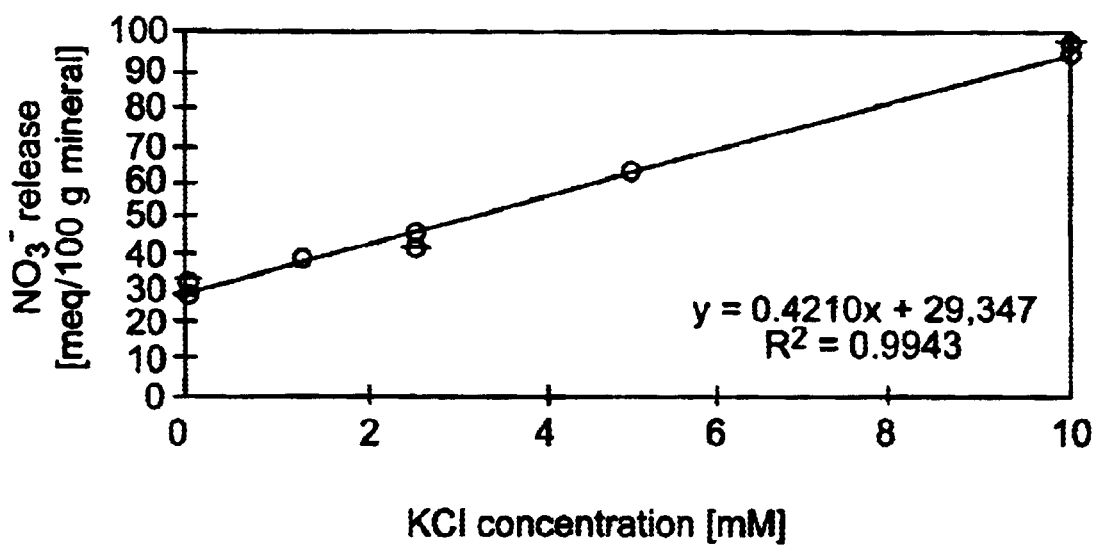
Figure 4:
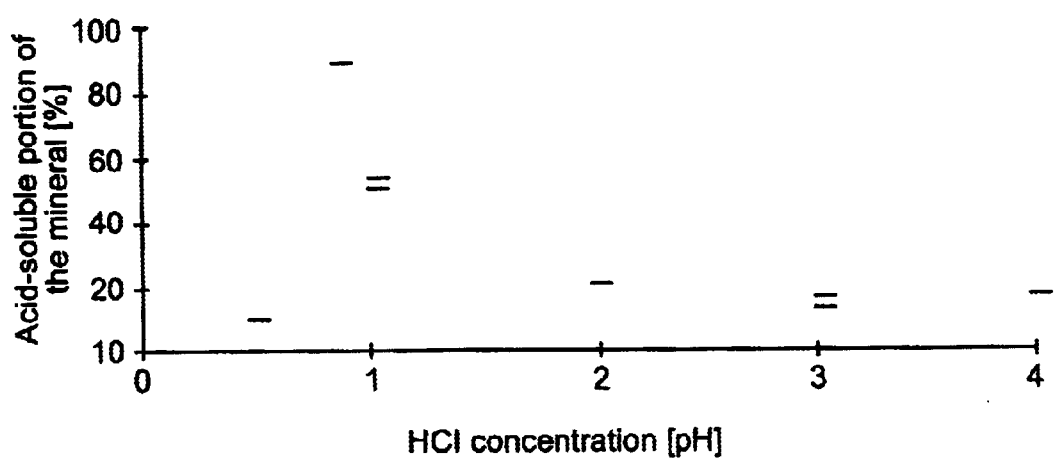
Figure 5:
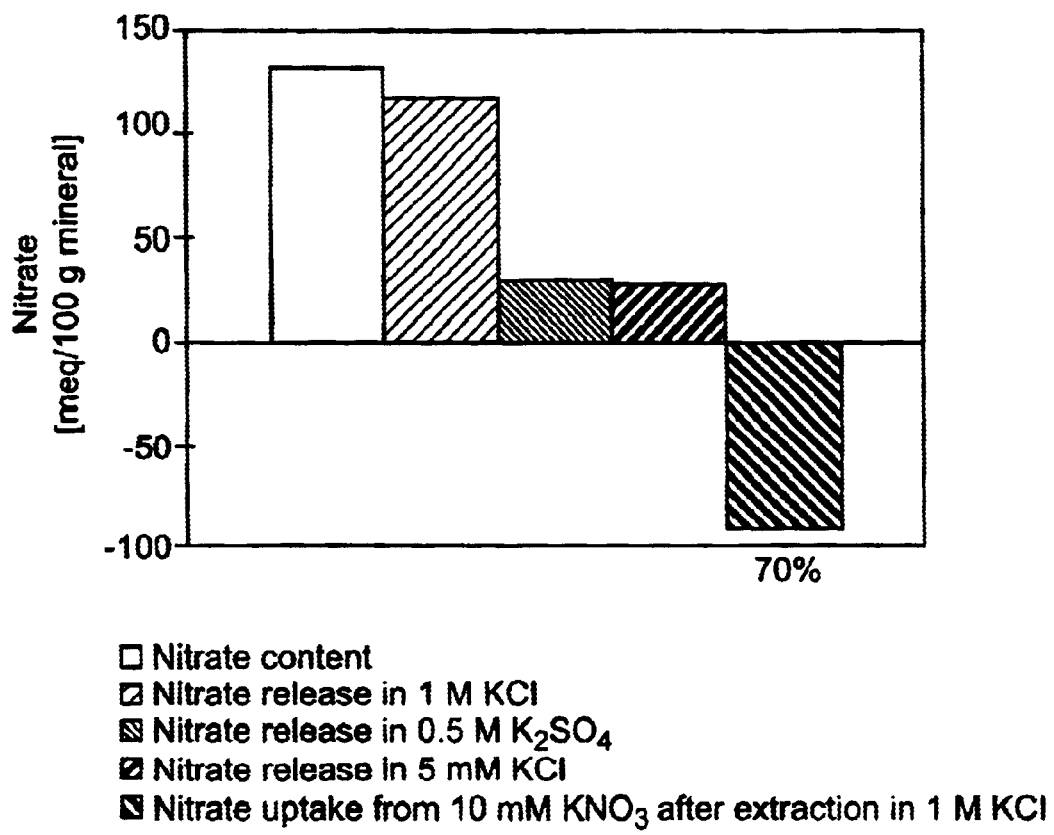

Certain aspects of the invention are explained below by means of diagrams which show:

FIG. 1: The structure of an LDH, using $Mg_6Fe_2(OH)_{16}(NO_3)_2$ as the example;

FIG. 2: Nitrate release from a Mg—Al—LDH as it depends on various extracting solutions;

FIG. 3: Nitrate release from a Mg—Al—LDH as it depends on the initial KCl concentration;

FIG. 4: The pH stability of a Mg—Al—LDH;

FIG. 5: Nitrate release and uptake of a Mg—Fe(III)—$NO_3^-$—LDH as it depends on various exchange solutions.

FIG. 1 shows the structure of an LDH, with $Mg_6Fe_2(OH)_{16}(NO_3)_2$ as the example. As described above, there are also other natural and synthetic laminar minerals with other cations, mostly bivalent and trivalent, and with other counterions. The laminar structure allows relatively problem-free exchange with other anions such as nitrate, sulfate, chloride or hydroxide. Nevertheless, there is binding, which is strong enough that these ions cannot easily leave the lattice. Thus, instead of simple "flushing out" there is deliberate release of the anions, especially the nitrate ions. It is driven, among other things, by the shift in equilibrium due to consumption.

FIG. 2 shows how the nitrate release from a Mg—Al—LDH depends on various extraction solutions. With a nitrate content of 160 meq [milliequivalents]/100 g mineral, equivalent to a nitrate content of scarcely 10%, based on the mineral, only 30 mg is released into the solution if deionized water is used as the extraction solution. But only 21 meq of nitrate is released into a solution containing 5 mM potassium nitrate. This shows a definite buffer action by the mineral with respect to the nitrate content of the surrounding medium. When 5 mM KCl is used, the nitrate release is 61 meq. The nitrate release is clearly increased over deionized water because the chloride and nitrate ions can exchange.

FIG. 3 shows the dependence of nitrate release from a Mg—Al—LDH on the initial KCl concentration. From this we see that the amount of nitrate released is related to the amount of chloride provided. Similar relations can be established for other anions.

FIG. 4 shows the pH stability of a Mg—Al—LDH. It shows what percentage by weight of the mineral goes into solution at a particular pH. As the minerals are largely stable down to pH 3, the mineral remains in the soil through a crop phase and longer, and can be charged with nitrate in another phase. The nitrate can come from fertilization or mineralization.

FIG. 5 shows the exchange behavior of a Mg—Fe(III)—$NO_3^-$—LDH in various solutions. As can be seen, the exchange of nitrate with sulfate goes very much slower than with chloride. That makes it possible to apply the LDHs as fertilizers with simultaneous application of fertilizers containing sulfate, which could otherwise cause overly rapid nitrate release. The figure also shows that the LDH can be recharged well with $NO_3^-$.

EXAMPLES

Preparation of a Me(II)—Me(III)—$NO_3^-$—LDH

1. Coprecipitation:

300 ml of a solution containing 0.4 molar iron(III) nitrate and 1.6 molar magnesium nitrate is prepared. This solution is added slowly, with stirring, to 120 ml distilled water which has been adjusted to pH 11±0.1 with 4 molar potassium hydroxide solution containing 0.6 molar potassium nitrate The pH is held constant with a pH-stat during the precipitation.

Conditions:

The precipitation reaction should take place over a long period. That is, less than 12 ml/hour, for example, 4 ml/hr, of the solution specified in (1) should be added slowly to the container with a peristaltic pump. The solutions should be handled in the absence of $CO_2$ and should be essentially free of carbonate.

2. Treatment of the precipitated product:

After termination of the precipitation reaction, the mineral product obtained is filtered off by suction and then subjected to heat treatment at 200° C.

3. Options:

The heat-treated product can next be treated with a hydrogen phosphate solution. That is done, for example, by stirring 10 g of the LDH in 1 liter of a 5 millimolar solution of potassium dihydrogen phosphate for 3 hours, then filtering and drying it.

An appropriate acid treatment is also possible.

The product obtained is finally washed in water and dried.

4. Alternatives:

Calcium nitrate can be used instead of magnesium nitrate. Aluminum nitrate can also be used instead of iron (III) nitrate.

The product is an LDH with a nitrate content of at least 9% by weight.

5. Advantages:

The $Mg$—$Fe$—$NO_3^-$—LDHs have the following advantageous properties:

The bound nitrate is not completely exchangeable in the first extraction step, even in a highly concentrated salt solution (1 M KCl). The slow, gradual nitrate exchange is advantageous with respect to a slowly releasing nitrate fertilizer.

Exchange with sulfate ions is more difficult than with chloride ions. That is an advantage because many fertilizers have a high sulfate content. Slow nitrate exchange from the LDHs recommended here is assured even after such fertilizers are applied.

After complete nitrate exchange, for example, the remaining Mg—Fe—Cl—LDH is capable of renewed nitrate adsorption. After applying 10 mM $KNO_3$ three times, the LDH has a nitrate content which can, for example, be 70% of the initial content.

All the LDHs reported are quite tolerable to plants and are not environmental pollutants.

To prepare a means for purifying wastewater, it is advantageous to use the corresponding chloride salts.

What we claim is:

1. A method of applying Layered Double Hydroxides (LDHs) that reversibly exchange nitrate as fertilizer and soil conditioner for the uniform supplying of arable land with nitrogen in the form of nitrate, wherein the LDHs contain anions exchangeably bound in the intermediate layer and are represented by the following formula:

$$(Mu^{II}_{(1-x)}M^{III}_x(OH)_2)^{x+}(A^{n-}_{x/n}).m\ H_2O$$

wherein $M^{II}$ denotes a divalent metal ion or 2Li, $M^{III}$ denotes a trivalent metal ion, $A^{n-}$ denotes an n-valent anion bound in the intermediate layer.

2. The method of claim 1, wherein the LDHs are natural or synthetic LDHs.

3. The method of claim 1, wherein the LDHs are essentially carbonate-free, and in which the divalent metal ion is Ca, Mg, Fe, Ni, Zn, Co, Cu or Mn;

the trivalent metal ion is Al, Fe, Cr or Mn;

the anion is sulfate, hydroxide, chloride or nitrate.

4. The method of claim 2, wherein applied natural or synthetic LDH contains up to about 30 wt % of nitrate ions.

5. The method of claim 1, wherein LDH application is in combination with auxiliary substances and additives.

6. The method of claim 1, wherein a conventional mixed fertilizer and optionally other fertilizer additives are added to the LDH.

7. The method of claim 1, wherein the LDH is present in a formulation with seed material, seedlings or propagation material.

8. The method of claim 7, wherein the propagation material, the seed material or the seedlings are present in coated form within the formulation together with the LDH and optionally with further additives.

9. The method of claim 1, wherein the LDH is present in a formulation in liquid form or in solid form.

10. The method of claim 9, wherein the solid form is a granulate.

11. A method of nitrate removal in purification of water, comprising exchanging anions from layered double hydroxides (LDHS) with nitrate in the water, wherein LDHs contain anions exchangeably bound in intermediate layers, and are represented by the following formula:

$$(M^{II}_{(1-x)}M^{III}_x(OH)_2)^{x+}(A^{n-}_{x/n}).m\ H_2O$$

wherein $M^{II}$ denotes a divalent metal ion or 2 Li, $M^{III}$ denotes a trivalent metal ion, and $A^{n-}$ denotes an anion bound in an interlayer, wherein the anion is sulfate or chloride.

12. The method of claim 11, wherein the LDHs are natural or synthetic LDHs.

13. The method of claim 11, wherein the LDHs are essentially carbonate-free, and wherein the divalent metal ion is Ca, Mg, Fe, Ni, Zn, Co, Cu or Mn;

the trivalent metal ion is Al, Fe, Cr or Mn.

14. The method of claim 13, wherein the anion is chloride.

15. The method of claim 13, wherein the divalent metal ion is Ca, Mg or Fe, and the anion is chloride.

16. The method of claim 11, wherein the water is drinking water.

17. The method of claim 11, wherein the water is waste water.

* * * * *